United States Patent

Hachtel

(10) Patent No.: US 6,402,265 B1
(45) Date of Patent: Jun. 11, 2002

(54) METHOD AND DEVICE FOR COMPENSATING FOR THE ACCUMULATOR PRESSURE IN AN ELECTROHYDRAULIC BRAKING SYSTEM

(75) Inventor: Juergen Hachtel, Moeckmuehl (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/539,650

(22) Filed: Mar. 30, 2000

(30) Foreign Application Priority Data

Mar. 30, 1999 (DE) .......................... 199 14 400

(51) Int. Cl.$^7$ ................................. B60T 8/42
(52) U.S. Cl. ................. 303/115.4; 303/116.1; 303/113.4
(58) Field of Search ............... 303/9.62, 11, 113.4, 303/155, DIG. 3, DIG. 4, 115.4, 116.1

(56) References Cited

U.S. PATENT DOCUMENTS

| | | | |
|---|---|---|---|
| 4,428,623 A | * 1/1984 | Bertling et al. | 303/114 |
| 5,544,948 A | * 8/1996 | Schmidt et al. | 303/122.11 |
| 5,567,021 A | * 10/1996 | Gaillard | 303/155 |
| 5,727,851 A | * 3/1998 | Ohkubo et al. | 303/116.1 |
| 5,845,976 A | * 12/1998 | Muenster | 303/155 |
| 5,941,608 A | * 8/1999 | Campau et al. | 303/113.4 |
| 5,979,999 A | * 11/1999 | Poertzgen et al. | 303/116.1 |
| 5,992,949 A | * 11/1999 | Nakamura et al. | 303/116.1 |
| 6,076,897 A | * 6/2000 | Binder et al. | 303/116.1 |
| 6,158,825 A | * 12/2000 | Schunck et al. | 303/115.4 |
| 6,192,685 B1 | * 2/2001 | Bourlon et al. | 60/566 |

FOREIGN PATENT DOCUMENTS

| | | |
|---|---|---|
| DE | 195 48 248 | 6/1997 |
| DE | 196 44 880 | 4/1998 |
| GB | 2297134 | 7/1996 |
| GB | 2318844 | 5/1998 |

OTHER PUBLICATIONS

SAE Technical Paper Series 960991, Int'l. Congress & Exposition, Detroit, MI, Feb. 26–29, 1996.

* cited by examiner

Primary Examiner—Christopher P. Schwartz
Assistant Examiner—Mariano Sy
(74) Attorney, Agent, or Firm—Kenyon & Kenyon

(57) ABSTRACT

A method and a device for compensating for an accumulator pressure in an electrohydraulic braking system of a motor vehicle, in which a valve arrangement controls an input of a hydraulic fluid from a pressure accumulator into wheel brake cylinders, the hydraulic fluid being deliverable by a pump into the pressure accumulator, in which a variable is defined that corresponds to a driving situation and/or a driver's command and that represents a setpoint wheel pressure with which at least one wheel brake cylinder is chargeable to achieve an optimal braking action, the variable is compared to another variable representing an accumulator pressure in the pressure accumulator to provide a comparison result, and the accumulator pressure is increased in response to the comparison result falling below a predefinable minimal difference between the variable representing the setpoint wheel pressure and the another variable representing the accumulator pressure.

6 Claims, 2 Drawing Sheets

METHOD AND DEVICE FOR COMPENSATING FOR THE ACCUMULATOR PRESSURE IN AN ELECTROHYDRAULIC BRAKING SYSTEM

FIELD OF THE INVENTION

The present invention relates to a method and a device for compensating for the accumulator pressure in an electrohydraulic braking system.

BACKGROUND INFORMATION

An electrohydraulic braking system is described, for example, in German Patent Application No. 195 48 248, which describes controlling the input of hydraulic fluid from a hydraulic pressure accumulator, via valves, into the particular wheel brake cylinders, the accumulator being charged by a pump.

German Patent No. 196 44 880 describes a method for operating a vehicle's braking system, which includes a power brake unit, a pump for building up pressure in the wheel brakes, as well as a brake pedal. An operating force being applied to a brake pedal is recorded in a first step; the variable representing the braking action is recorded in a second step; it is determined in a third step, on the basis of the operating force and the variable representing the braking action, whether the braking action corresponds to the action expected by the brake pedal actuation, the braking action not corresponding to the expected action when the two variables deviate from one another; and a pressure buildup is triggered in a fourth step by actuation of the pump when the braking action does not correspond to the expected action.

In electrohydraulic braking systems (EHB), wheel pressures from a hydraulic high-pressure accumulator are applied via valves. Excessive strain on the brakes can lead to degradation of the braking performance (so-called brake fading). Given the same wheel circuit pressure, diminished braking action results in lower (or less effective) vehicle deceleration. When working with conventional braking systems, it is possible to compensate for this effect by applying an increased braking pedal force. In EHB systems, however, it can happen that the system's hydraulic accumulator pressure does not suffice for applying this necessary wheel pressure.

Electrohydraulic braking systems are also discussed in the article entitled "SAE Technical Paper Series 960991", International Congress & Exposition, Detroit, Mich., Feb. 26–29, 1996. This article discusses, inter alia, ascertaining a brake fading by observing a deceleration control. Provision can be made in such a case to raise the pressure level in the electrohydraulic braking system. It is believed that the method proposed in this article may be relatively expensive, since it may be necessary to compensate brake fading via special deceleration-control devices.

SUMMARY OF THE INVENTION

An object of an exemplary embodiment of the present invention is, therefore, to provide an electrohydraulic braking system, which will enable the required hydraulic accumulator pressure to be adjusted in a simple manner.

This object may be achieved by a method for compensating for the hydraulic accumulator pressure in an electrohydraulic braking system.

In accordance with an exemplary embodiment of the present invention, a method is provided for compensating for the accumulator pressure in an electrohydraulic braking system, in which a wheel setpoint pressure is compared in a simple manner to an active accumulator pressure, and in response to falling below (or failing to meet) a predefinable (or preset) minimum difference, the accumulator pressure is raised accordingly.

The variable representing the wheel setpoint pressure is expediently determined from a brake pedal travel, and/or a master brake cylinder pressure, and/or from the vehicle speed. These parameters are able to be determined relatively simply and make it possible for one to define an optimal wheel setpoint pressure with adequate precision.

It is also beneficial for a motor vehicle driver to be prompted when a compensation of accumulator pressure has taken place. It is believed that this measure raises the safety standard of the motor vehicle, since an occurring brake fading is able to be indicated, allowing the driver, if needed, to correct his driving technique or seek out a service station.

DETAILED DESCRIPTION

The method according to an exemplary embodiment of the present invention will now be explained on the basis of the electrohydraulic braking system depicted in FIG. 1. Again, it is emphasized that the electrohydraulic braking system depicted in FIG. 1 is merely an example of an electrohydraulic braking system, for which the method according to an exemplary embodiment of the present invention can be used.

Figure 1:
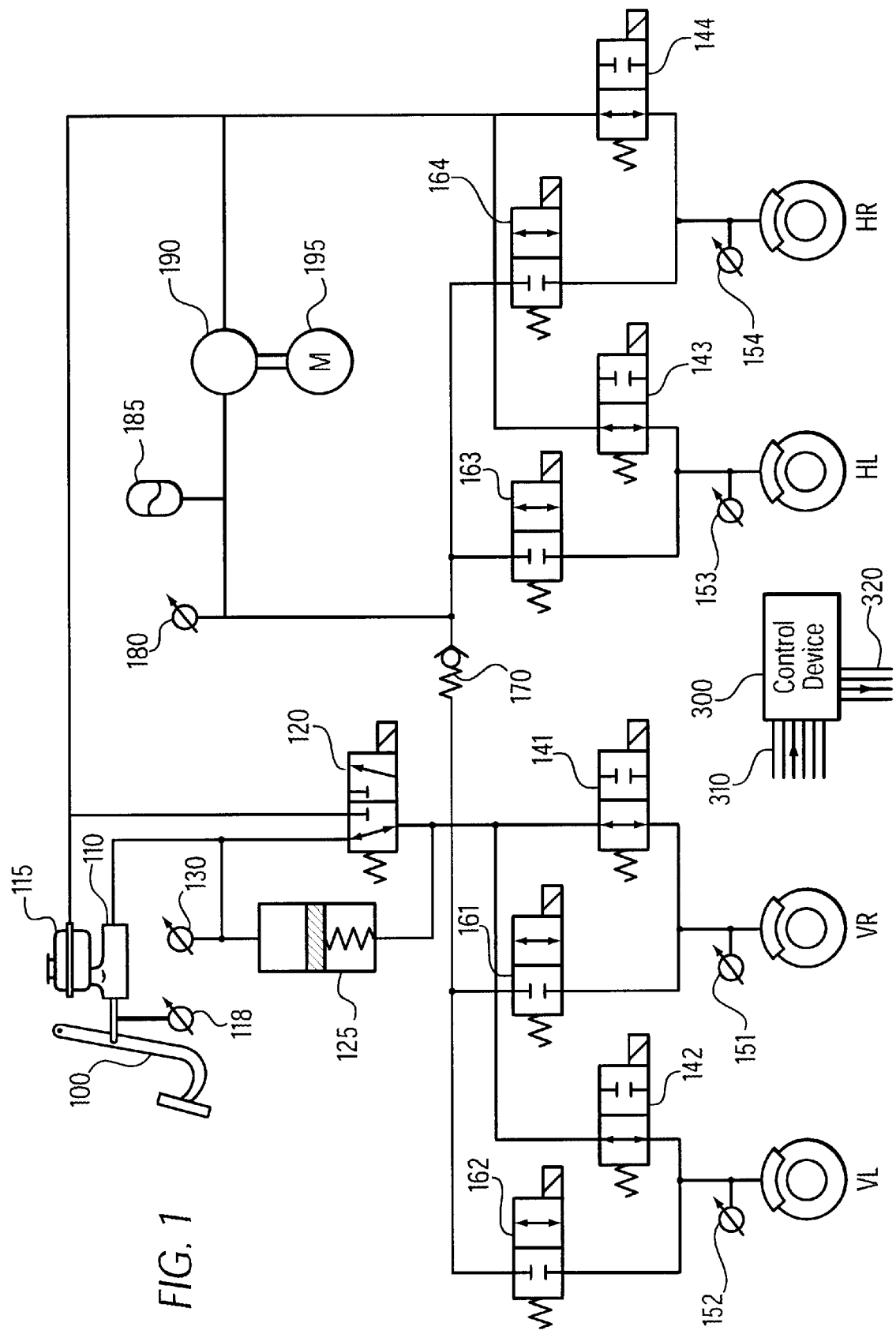
FIG. 1 shows an exemplary embodiment of an electrohydraulic braking system, where the hydraulic accumulator pressure is able to be compensated in accordance with an exemplary embodiment of the present invention.

FIG. 1 shows the important elements of an electrohydraulic braking system. A brake pedal is denoted by 100. By way of the brake pedal, pressure can be built up in a master brake cylinder 110. A pedal travel sensor 118 is able to record the movement of the brake pedal. Master brake cylinder 110 is in contact with a pressure fluid supply reservoir 115. Master brake cylinder 110 is connected to a safety valve 120, which, when not conducting current, is situated in the position shown. A pedal travel simulator 125 is connected in parallel to the safety valve. Arranged in the connecting line between master brake cylinder 10 and safety valve 120, i.e., pedal travel simulator 125, is a pressure sensor 130, which makes available a signal indicating the pressure PHZ in master brake cylinder 110.

In the non-current-conducting state, safety valve 120 releases the connection between the master brake cylinder and outlet valves 141 and 142. In their non-current-conducting states, the outlet valves are likewise switched into their flow-through position and release the connection to the wheel brake cylinders.

Outlet valve 141 is assigned to wheel brake cylinder VR of the right front wheel, and outlet valve 142 is assigned to wheel brake cylinder VL of the left front wheel. The pressure prevailing in the wheel brake cylinders can be detected by sensors 151, 152.

In addition, the wheel brake cylinders are in contact via inlet valves 161 and 162, and a check valve 170, with an accumulator 185. The pressure in the accumulator can be detected by a pressure sensor 180. Inlet valve 161 is assigned to the right front wheel, and inlet valve 162 to the left front wheel.

Furthermore, accumulator 185 is in contact via inlet valves 163 and 164 with wheel brake cylinder HL of the left rear wheel, i.e., with wheel brake cylinder HR of the right rear wheel. The wheel brake cylinders of the left rear wheel, i.e., of the right rear wheel, are in contact, in turn, via outlet valves 143, i.e., outlet valves 144, with supply reservoir 115.

Outlet valves 141 and 142 can likewise be brought into contact via safety valve 120, with supply reservoir 115.

A pump 190, which is operated by a pump motor 195, delivers hydraulic fluid from supply reservoir 115 into accumulator 185. In accordance with the delivery by pump 190, the pressure prevailing in accumulator 185 is able to be raised or lowered.

A control device for controlling the depicted electrohydraulic braking system is schematically denoted by 300. Through (likewise schematically depicted) lines 310, control device 300 receives signals, which describe the active state of the motor vehicle, i.e., of the braking system, for example pressure signals from pressure sensors 118, 130, 151, 152, 153 and 154. In addition, control unit 300 can receive other signals, for example pedal travel or the motor vehicle's speed, which are determined by appropriate sensors. Through additional lines 320, likewise schematically shown, control unit 300 drives the valves in question, i.e., pump motor 195, to operate the electrohydraulic braking system. For the sake of clarity, the signal lines going out from each of the components (pressure sensors, valves, motor) are not shown individually.

The depicted system operates in the following manner: during normal operation, safety valve 120 conducts current. Safety valve 120 releases the connection between supply reservoir 115 and the outlet valves, and interrupts the connection between master brake cylinder 110 and the outlet valves. If the driver actuates brake pedal 100, then sensor 118 detects a signal corresponding to the pedal travel of brake pedal 100, and/or sensor 130 supplies a pressure signal with respect to the pressure prevailing in the master brake cylinder.

On the basis of at least one of these signals, which correspond to the driver's command, and possibly to other operating parameters (such as the vehicle speed), control unit 300 defines a setpoint braking pressure, which is to be, i.e., should be applied to the wheel brake cylinders, and produces corresponding driving signals to be received by inlet valves 161, 162, 163, and 164, as well as by outlet valves 141, 142, 143, and 144.

By opening inlet valves 161 through 164, and closing outlet valves 141 through 144, the pressure prevailing in the wheel brake cylinders is increased as a function of the driver's command. The pressure required for this is made available by accumulator 185, in which a preset normal system pressure prevails. The normal system pressure prevailing in accumulator 185 is reduced in response to the inlet valves opening to produce the desired wheel setpoint pressure. To re-establish or maintain the normal system pressure, current is applied to pump motor 195 to drive pump 190, and hydraulic fluid is delivered by supply reservoir 115 into accumulator 185.

By opening the outlet valves and closing the inlet valves, the pressure prevailing in the wheel brake cylinders can be reduced again in conformance with the pedal actuation.

In the case of brake fading at the wheel brake cylinders, it can happen that the determined "optimal" wheel setpoint pressure is very close to the normal system pressure, since it is necessary for a higher pressure to be applied to the wheel brake cylinders to achieve the same braking action. The situation can even arise that the setpoint wheel pressure reaches or exceeds the normal system pressure. To recognize this potentially dangerous situation, the setpoint wheel pressure determined by control unit 300 is compared to the accumulator pressure prevailing in accumulator 185. If the difference between these two pressure values falls below a predefined minimum value, pump 190 is driven by motor 195 to increase the normal system pressure prevailing in accumulator 185. A comparison of this kind can be carried out, for example, in regular intervals in response to an established braking command, but also without the existence of a specific braking command.

Figure 2:
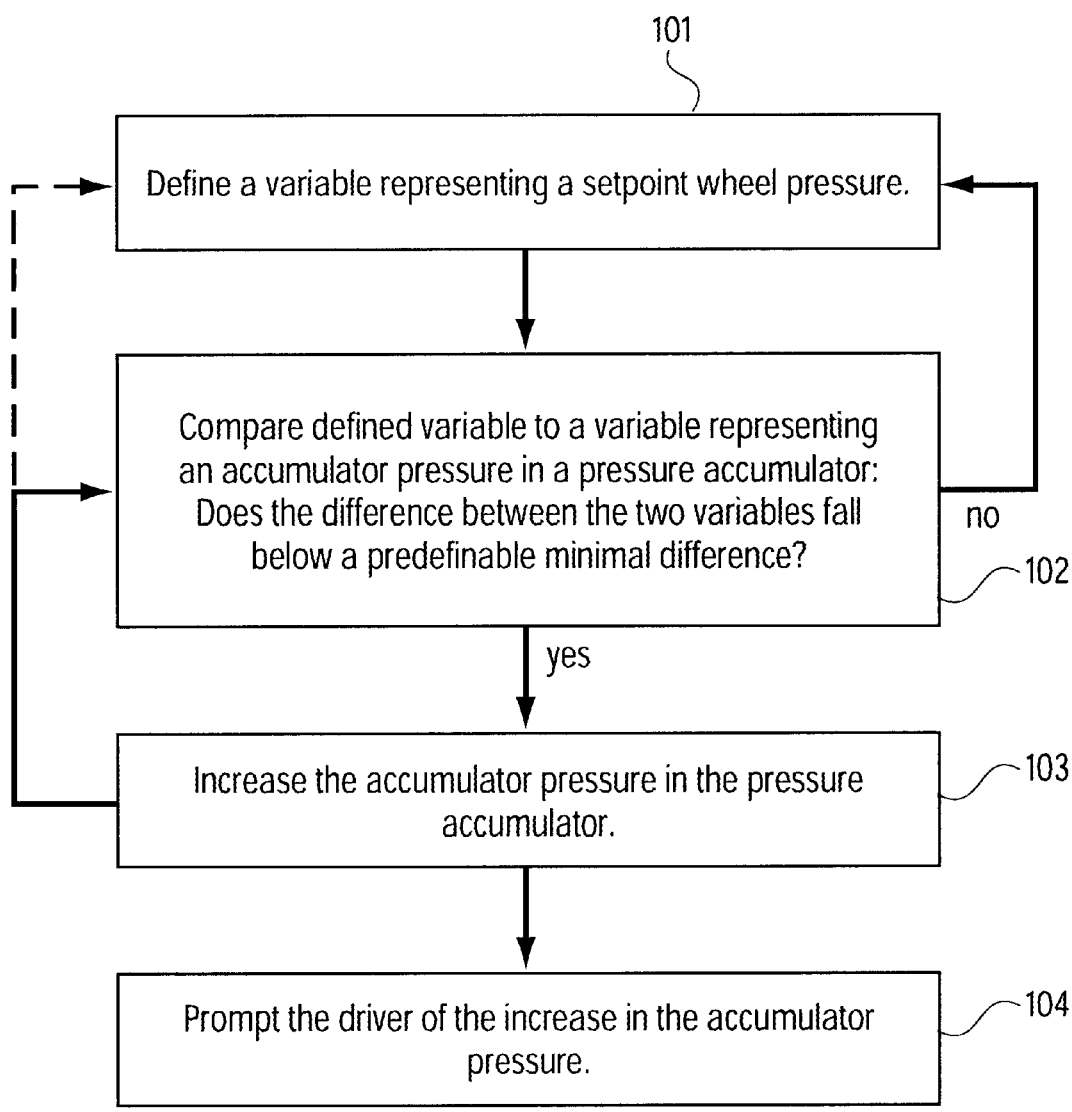
FIG. 2 shows a flow chart illustrating an exemplary embodiment of the method of the present invention.

This method is explained once more on the basis of the flowchart of FIG. 2. In a step 101, the variable describing the setpoint wheel pressure is defined. Subsequently, in a step 102, the defined variable is compared to the variable describing the accumulator pressure prevailing in accumulator 185. When the difference between these two variables falls below the minimum predefinable difference, i.e., a predefinable minimum value, the accumulator pressure prevailing in the accumulator is increased, as described, in a step 103. If, in carrying out step 102, the difference between the two variables does not fall below the predefinable minimum difference, then the system branches back to step 101.

Once step 103 is carried out to increase the accumulator pressure prevailing in accumulator 185, the system branches back to step 102, where the increased accumulator pressure is compared once again to the variable describing the setpoint wheel pressure. As indicated by the dotted line, it is also possible for this system to branch back directly from step 103 to step 101.

In the case of an increase in the accumulator pressure, it is preferred that this be indicated to the driver of the motor vehicle in a step 104.

This measure of increasing the accumulator pressure, i.e., the normal system pressure, will be further explained on the basis of two typical situations: if, for example, during vehicle travel (vehicle speed greater than a parameterizable minimum speed), in response to a pedal actuation by the driver, a specific setpoint wheel pressure is established, which is close to the active accumulator pressure, i.e., normal system pressure (for example, setpoint wheel pressure 130 bar, accumulator pressure 150 bar), the accumulator pressure prevailing in accumulator 185 is increased by driving pump 190 in such a way that ensures that the desired setpoint wheel pressure is adjustable on the basis of the accumulator pressure. It is conceivable, for example, to adjust the minimal difference between the accumulator pressure and the wheel setpoint pressure in such a way that, to ensure a reliable braking operation, even in the case of an additional, sudden increase in the setpoint wheel pressure, a sufficient "pressure buffer" remains between the accumulator pressure and the setpoint wheel pressure.

If, in addition, it is recognized, for example, in the case of low vehicle speeds, that, on the basis of an elevated setpoint wheel pressure at the driven axle and on the basis of the information from a traction control system (ASR), that an ASR control is active, in which the setpoint wheel pressure is approximately equal to the accumulator pressure (for example when starting from rest on a slope having different coefficients of friction on each side of the road), then the accumulator pressure in accumulator 185 is likewise increased (for example from a normal pressure of about 160 bar to about 180 through 200 bar, depending on the braking system).

Therefore, using the method according to an exemplary embodiment of the present invention, the operational state of a brake fading, for example, can be ascertained in a simple and reliable manner, since, under normal operational conditions, i.e., fully operational brakes, the setpoint wheel pressure always observes a sufficient difference from the normal accumulator pressure in accumulator 185. The operational state "brake fading" can be indicated to the driver, so that he can correct his driving technique accordingly, for example by driving more slowly, by applying the engine brake, or, if necessary, by seeking out a service station.

Therefore, the method according to an exemplary embodiment of the present invention makes it possible in a simple and reliable manner to compensate for a fading braking action in accordance with a conventional braking system, by increasing the accumulator pressure. In this manner, the safety and availability of an electrohydraulic braking system is increased; in addition, the driver receives additional information on the status of the braking system of his vehicle.

What is claimed is:

1. A method for compensating for an accumulator pressure in an electrohydraulic braking system of a motor vehicle, in which a valve arrangement controls an input of a hydraulic fluid from a pressure accumulator into wheel brake cylinders, the hydraulic fluid being deliverable by a pump into the pressure accumulator, the method comprising the steps of:

defining a variable corresponding to at least one of a driving situation and a drivers's command and representing a set point wheel pressure with which at least one wheel brake cylinder is chargeable to achieve an optimal braking action;

comparing the variable to another variable representing an accumulator pressure in the pressure accumulator and providing a comparison result, wherein the step of comparing continually takes place at regular intervals; and increasing the accumulator pressure in response to the comparison result falling below a predefined minimal difference between the variable representing the setpoint wheel pressure and the another variable representing the accumulator pressure.

2. The method of claim 1, wherein the setpoint wheel pressure is used as the variable representing the setpoint wheel pressure and the accumulator pressure is used as the another variable representing the accumulator pressure.

3. The method of claim 1, wherein the variable representing the setpoint wheel pressure is determined from at least one of a brake pedal travel, a master brake cylinder pressure and a vehicle speed.

4. The method of claim 1, further comprising the step of prompting a driver of the motor vehicle when the accumulator pressure has been compensated.

5. A device for compensating for an accumulator pressure in an electrohydraulic braking system of a motor vehicle, the electrohydraulic braking system including a pump, a pressure accumulator and wheel brake cylinders, the device comprising:

means for controlling an input of a hydraulic fluid from the pressure accumulator into the wheel brake cylinders, the hydraulic fluid being deliverable by means for defining a variable corresponding to at least one of a driving situation and a driver's command and representing a setpoint wheel pressure with which at least one wheel brake cylinder is chargeable to achieve an optimal braking action;

means for continually comparing, at regular intervals, the variable to another variable representing an accumulator pressure in the accumulator and for providing a comparison result; and means for increasing the accumulator pressure in response to the comparison result falling below a predefined minimal difference between the variable representing the setpoint wheel pressure and the another variable representing the accumulator pressure.

6. The device of claim 5, further comprising means for providing information indicating that the accumulator pressure has been compensated.

\* \* \* \* \*

UNITED STATES PATENT AND TRADEMARK OFFICE
CERTIFICATE OF CORRECTION

PATENT NO.     : 6,402,265 B1
DATED          : June 11, 2002
INVENTOR(S)    : Juergen Hachtel It is certified that error appears in the above-identified patent and that said Letters Patent is hereby corrected as shown below:

Column 6,
Line 21, change "deliverable by" to -- deliverable by the pump into the pressure accumulator; --.

Signed and Sealed this

Nineteenth Day of August, 2003

JAMES E. ROGAN
*Director of the United States Patent and Trademark Office*